(12) United States Patent
Taguchi et al.

(10) Patent No.: US 10,875,672 B2
(45) Date of Patent: Dec. 29, 2020

(54) BINDING MACHINE FOR GARDENING

(71) Applicant: MAX CO., LTD., Tokyo (JP)

(72) Inventors: Satoshi Taguchi, Tokyo (JP); Toshihide Miwa, Tokyo (JP)

(73) Assignee: MAX CO., LTD., Tokyo (JP)

( * ) Notice: Subject to any disclaimer, the term of this patent is extended or adjusted under 35 U.S.C. 154(b) by 0 days.

(21) Appl. No.: 15/622,152

(22) Filed: Jun. 14, 2017

(65) Prior Publication Data

US 2017/0361960 A1    Dec. 21, 2017

(30) Foreign Application Priority Data

Jun. 15, 2016    (JP) ................................. 2016-119283

(51) Int. Cl.
| | |
|---|---|
| B65B 13/18 | (2006.01) |
| B65B 13/02 | (2006.01) |
| B65B 13/16 | (2006.01) |
| B65B 13/34 | (2006.01) |
| B65B 13/20 | (2006.01) |
| B65B 27/10 | (2006.01) |
| B65H 35/04 | (2006.01) |
| B65H 37/04 | (2006.01) |

(Continued)

(52) U.S. Cl.
CPC .............. *B65B 13/185* (2013.01); *A01F 1/04* (2013.01); *B65B 13/025* (2013.01); *B65B 13/16* (2013.01); *B65B 13/345* (2013.01); *B65B 27/105* (2013.01); *A01G 17/085* (2013.01); *B65B 13/20* (2013.01); *B65H 35/04* (2013.01); *B65H 37/04* (2013.01)

(58) Field of Classification Search
CPC ............ B65H 35/0066; B65H 35/0026; B65H 35/0033; A01F 1/04; A01G 17/08; A01G 9/12; A01G 17/085; B65B 13/185; B65B 13/025; B65B 13/16; B65B 13/345; B65B 11/50; B65B 11/52; B65B 27/105; B65B 27/10

See application file for complete search history.

(56) References Cited

U.S. PATENT DOCUMENTS 5,595,100 A * 1/1997 Sollo .......................... B25B 7/00
                                                      16/421
6,382,289 B1   5/2002 Jho
(Continued)

FOREIGN PATENT DOCUMENTS

| AU | 4021399 A1 | 7/1999 |
|---|---|---|
| CN | 2149097 Y | 12/1993 |

(Continued)

OTHER PUBLICATIONS

European Search Report dated Nov. 14, 2017 in EP 17 17 6064.8.

*Primary Examiner* — Alex B Efta
(74) *Attorney, Agent, or Firm* — Rothwell, Figg, Ernst & Manbeck, P.C.

(57) ABSTRACT

The operation handle includes a link portion engaged with the main handle on one side as viewed from the rotation fulcrum and a lever operation portion on the other side as viewed from the rotation fulcrum. The clincher arm is configured to rotate in a closing direction with respect to the main handle when the lever operation portion and the main handle are gripped. The binding machine for gardening further comprises a cover member configured to cover the link portion.

12 Claims, 7 Drawing Sheets

(51) Int. Cl.
  *A01D 39/00* (2006.01)
  *A01F 1/04* (2006.01)
  *A01G 17/08* (2006.01)
  *A01G 22/00* (2018.01)
  *A01G 9/12* (2006.01)

(56) References Cited

U.S. PATENT DOCUMENTS

| | | |
|---|---|---|
| 2003/0126955 A1 | 7/2003 | Hartranft |
| 2004/0163495 A1 | 8/2004 | Konen |
| 2004/0205897 A1 | 10/2004 | Hartranft |
| 2004/0237805 A1 | 12/2004 | Hayashi et al. |
| 2005/0028497 A1* | 2/2005 | Hayashi ............... A01G 17/085 53/592 |
| 2007/0034338 A1 | 2/2007 | Ogawa |
| 2008/0104886 A1* | 5/2008 | Nakamura ........... A01G 17/085 47/1.01 S |
| 2015/0307216 A1 | 10/2015 | Sato et al. |

FOREIGN PATENT DOCUMENTS

| | | |
|---|---|---|
| CN | 1630969 A | 6/2005 |
| CN | 101779585 A | 7/2010 |
| EP | 1 422 144 A1 | 5/2004 |
| EP | 1 840 031 A1 | 10/2007 |
| JP | 2003-23881 A | 1/2003 |
| JP | 2003-34615 A | 12/2003 |
| JP | 2004-173566 A | 6/2004 |
| JP | 2006-050913 A | 2/2006 |
| JP | 2008-072928 A | 4/2008 |
| JP | 4120369 B2 | 7/2008 |
| JP | 2010-051248 A | 3/2010 |
| JP | 2010-274937 A | 12/2010 |
| JP | 4957918 B2 | 6/2012 |
| WO | 2014/084205 A1 | 6/2014 |

* cited by examiner

BINDING MACHINE FOR GARDENING

CROSS-REFERENCE TO RELATED APPLICATION

This application claims priority from Japanese Patent Application No. 2016-119283 filed on Jun. 15, 2016, the entire contents of which are incorporated herein by reference.

TECHNICAL FIELD

The present invention relates to a binding machine for gardening that is used for guiding/binding work in agricultural crop cultivation.

BACKGROUND

In the related art, a binding machine for gardening is used for guiding/binding work at the time of cultivation of agricultural crops. Specifically, the binding machine for gardening is used to bind plant vines and stems to poles or nets in cultivation of agricultural crops such as cucumbers, grapes, or tomatoes.

For example, as disclosed in Japanese Unexamined Patent Application Publication No. 2003-23881, this type of binding machine for gardening includes a main handle capable of drawing out a tape from a front end portion and a clincher arm rotatable with respect to the main handle. When an operation handle of the binding machine for gardening is lightly gripped, the clincher arm rotates in a closing direction with respect to the main handle, and a tape gripping device provided at a front end portion of the clincher arm grips the tape drawn out from the front end portion of the main handle. When the squeezing of the handle is released in this state, the clincher arm rotates in an opening direction with respect to the main handle, and the tape is drawn out. When the tape is drawn out and the tape is stretched between the clincher arm and the main handle, the agricultural crops and poles are pressed against the drawn-out tape, and the agricultural crops and the poles are inserted between the clincher arm and the main handle. When the handle is further gripped again in this state, the clincher arm rotates in the closing direction with respect to the main handle, and a tape loop is formed. When the handle is further gripped, both end portions of the tape loop are bound by a staple, the end portions of the tape loop are cut by a cutter, and thus the binding is completed.

In such a binding machine for gardening, an operation handle is rotatably attached to the clincher arm, and the clincher arm can be rotated by the operation of squeezing the operation handle and the main handle.

SUMMARY

In the tape gripping device according to the related art, since an engaging portion between the operation handle and the main handle is exposed, when a machine body is placed on the ground or dropped, dust adheres to the engaging portion, so that sliding failure may occur.

In addition, since the engaging portion is exposed, a hook formed at a front end portion of the operation handle jumps out from the machine when the operation handle is gripped, and the hook is caught on a net string or the like for supporting crops. When the hook is caught on the net string, there are problems that the net string is pulled and the net string is sandwiched into the machine, resulting in locking the machine.

Therefore, the invention is to provide a binding machine for gardening capable of eliminating problems that dust adheres to the periphery of an engaging portion of an operation handle and a main handle, resulting in causing an operational failure and that a hook provided at a front end portion of the operation handle is caught on a net string.

The invention has been made to solve the problems, and is characterized by the following.

(1) A binding machine for gardening comprising:
  a main handle that is configured to draw out a tape from a front end portion thereof;
  a clincher arm that is rotatably attached to the main handle;
  a tape gripping device that is attached to a front end portion of the clincher arm and that is configured to grip an end portion of the tape drawn out from the front end portion of the main handle; and
  an operation handle that is attached to the clincher arm so as to be rotatable about a rotation fulcrum, wherein
  the operation handle includes a link portion engaged with the main handle on one side as viewed from the rotation fulcrum and a lever operation portion on the other side as viewed from the rotation fulcrum,
  the clincher arm is configured to rotate in a closing direction with respect to the main handle when the lever operation portion and the main handle are gripped, and
  the binding machine for gardening further comprises a cover member configured to cover the link portion.

(2) The binding machine for gardening according to (1), wherein
  the cover member is provided with a curved projection, which is formed along a finger squeezing the lever operation portion and the main handle, on a side portion thereof.

(3) The binding machine for gardening according to (1) or (2), wherein the cover member covers a crossing portion of the main handle and the clincher arm.

(4) The binding machine for gardening according to (1) to (3), wherein the lever operation portion is formed by the cover member.

According to the above (1), the operation handle includes the link portion engaged with the main handle on one side as viewed from the rotation fulcrum and the lever operation portion on the other side as viewed from the rotation fulcrum, and the operation handle further includes the cover member that covers the link portion. With such a configuration, when the machine drops down or the machine is placed on the ground, foreign materials do not adhere to the periphery of the link portion, and thus the sliding failure of the link portion can be prevented. Further, the problem also does not occur that the hook formed at the front end portion of the link portion is entangled in the net string.

According to the above (2), the curved projection is provided along the finger squeezing the lever operation portion and the main handle, on the side portion of the cover member. With such a configuration, it is possible to easily hold the machine by hooking the finger in the curved projection, and to prevent the machine from dropping accidentally down.

According to the above (3), the cover member covers the crossing portion of the main handle and the clincher arm. With such a configuration, when the machine drops down or the machine is placed on the ground, foreign materials do not adhere to the periphery of the crossing portion, and thus the sliding failure of the crossing portion can be prevented.

According to the above (4), the lever operation portion is formed by the cover member. With such a configuration, only by the replacement with the cover member having a different shape, the lever operation portion having a shape matching the worker's hand can be provided. Accordingly, it is possible to provide the binding machine for gardening, which is easy to grip and to work, at a low cost.

DETAILED DESCRIPTION

An embodiment of the invention will be described with reference to the drawings. In the following description, the front means a direction (a right direction in FIG. 2) in which a binding machine for gardening 10 faces an object S to be bound at the time of use, and the rear means a direction (a left direction in FIG. 2) opposite to the front.

Figure 1:
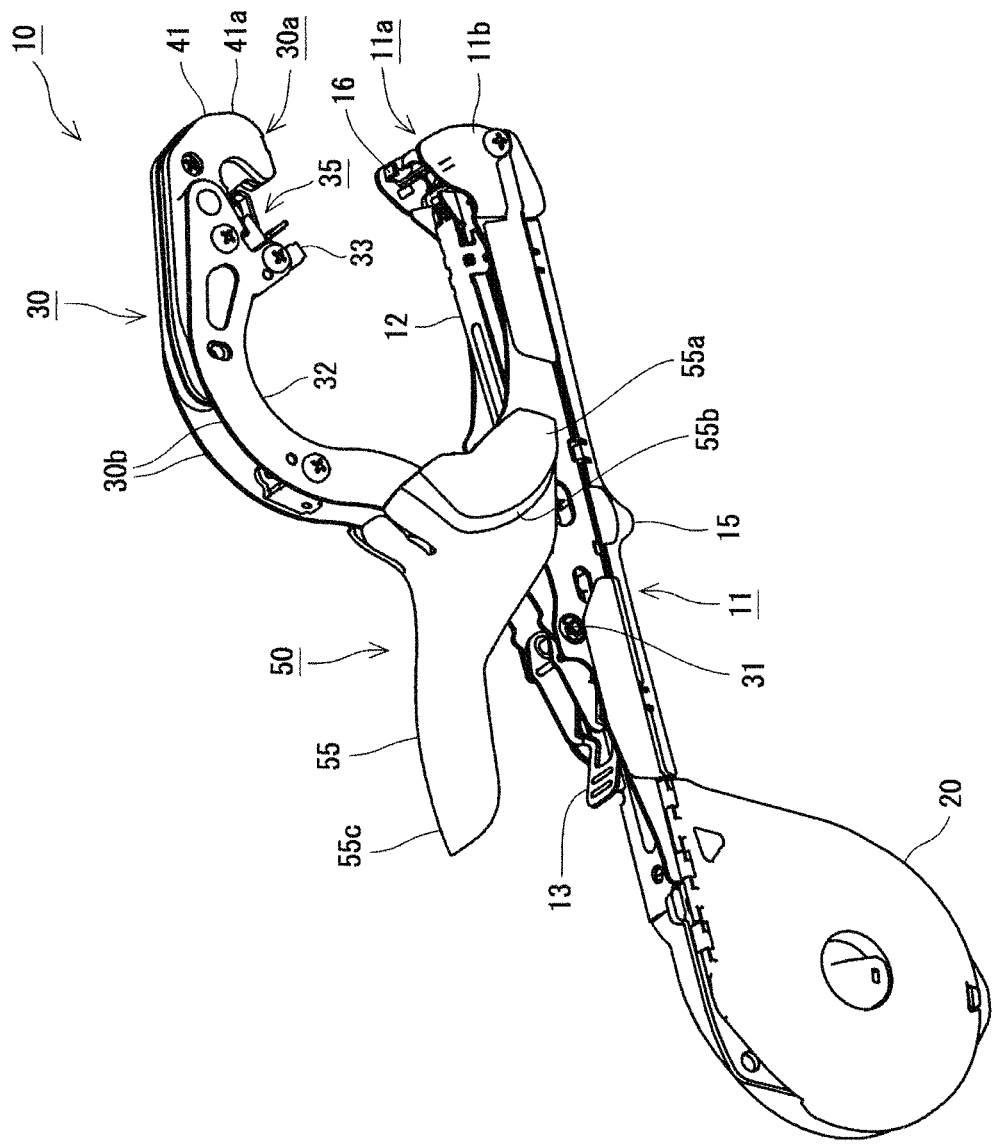
FIG. 1 is an external perspective view of a binding machine for gardening.
Figure 2:
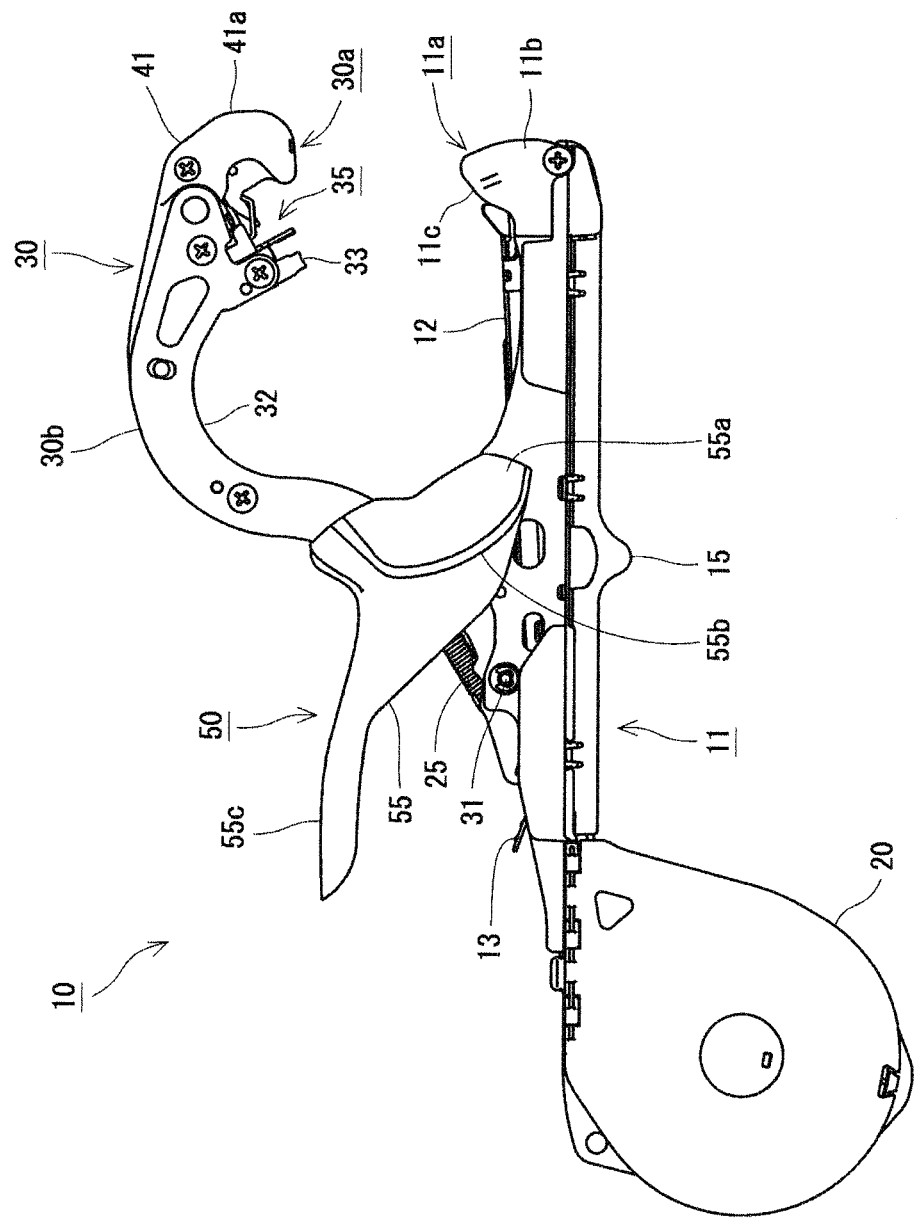
FIG. 2 is a side view of the binding machine for gardening and illustrates a state in which a clincher arm is opened with respect to a main handle.
Figure 3:
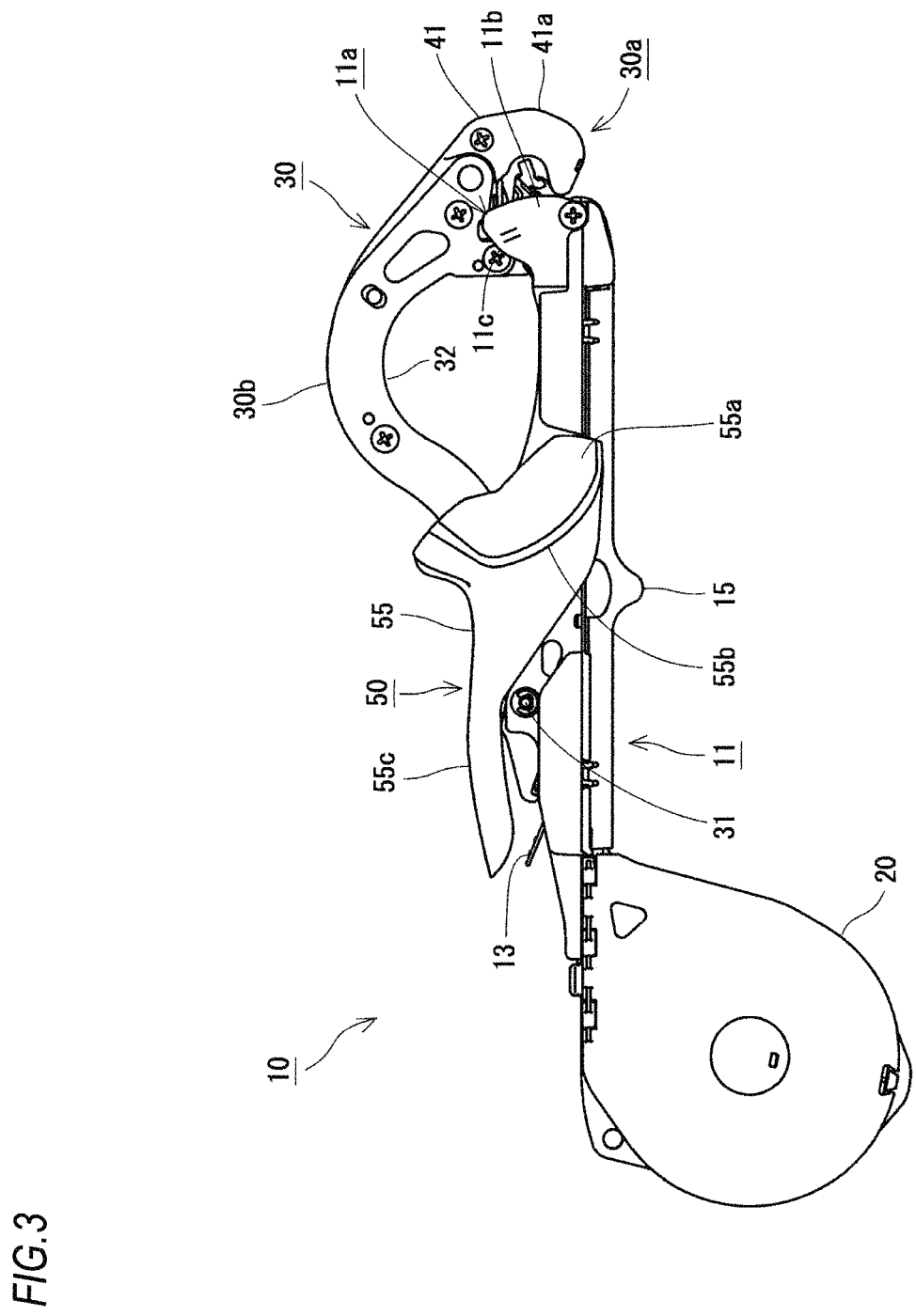
FIG. 3 is a side view of the binding machine for gardening and illustrates a state in which the clincher arm is completely closed with respect to the main handle.
Figure 4:
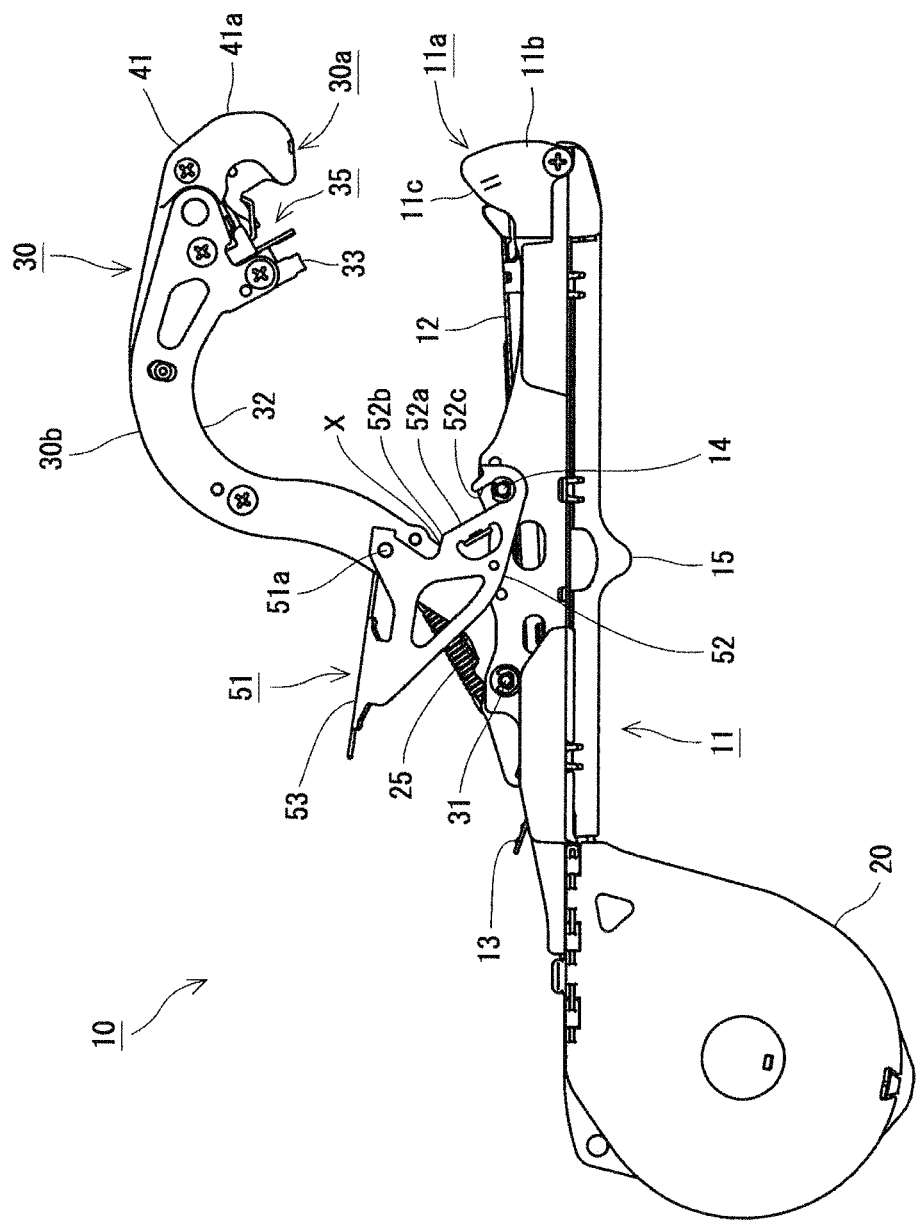
FIG. 4 is a side view of the binding machine for gardening from which a cover member of an operation handle is removed and illustrates a state in which the clincher arm is opened with respect to the main handle.

As illustrated in FIGS. 1 to 3, the binding machine for gardening 10 according to the embodiment is used for guiding/binding work in agricultural crop cultivation includes an elongated main handle 11 that is linearly formed, a clincher arm 30 that is rotatably attached to the main handle 11, and an operation handle 50 that is rotatably attached to the clincher arm 30. As illustrated in FIG. 4, the clincher arm 30 is constantly urged by a tension spring 25, and is in an open state with respect to the main handle 11 in normal times. When the operation handle 50 and the main handle 11 are gripped from this state, as illustrated in FIG. 3, the clincher arm 30 is configured to rotate in a closing direction with respect to the main handle 11. Then, when the clincher arm 30 rotates in the closing direction up to a predetermined position with respect to the main handle 11, in order to draw out a tape from a front end portion 11a of the main handle 11, a gripping operation is executed to grip the tape at a front end portion 30a of the clincher arm 30 and a binding operation is executed to bundle the object to be bound with the tape and to cut the tape when the clincher arm 30 further rotates in the closing direction from the predetermined position with respect to the main handle 11 and is thus completely closed (closed state). In the gripping operation, that is, the clincher arm 30 rotates with respect to the main handle 11 up to a predetermined position without squeezing the handle up to a completely closed position. Meanwhile, in the binding operation, the clincher arm 30 further rotates in the closing direction from the predetermined position with respect to the main handle 11 by performing a squeezing operation of the handle up to the completely closed position. In this way, the gripping operation and the binding operation can be switched by the end point position of the squeezing operation.

First, the handle is gripped, and the clincher arm 30 rotates in the closing direction with respect to the main handle 11, thereby binding the object to be bound. Thus, the gripping operation is executed to grip the tape at the front end portion 30a of the clincher arm 30. Thereafter, when the squeezing of the handle is released and thus the clincher arm 30 rotates in the opening direction with respect to the main handle 11, the front end portion 30a of the clincher arm 30 and the front end portion 11a of the main handle 11 are separated from each other in a state where the tape is gripped, and the tape is in a state of being stretched between the clincher arm 30 and the main handle 11. The objects to be bound such as seedlings or branches are introduced from the outside of the tape stretched in this state, the handle is gripped again, and thus the clincher arm 30 rotates in the closing direction with respect to the main handle 11. Thus, both end portions of a tape loop for binding the objects to be bound are bonded by a staple, and the tape is cut (the binding operation is executed). In this manner, the gripping operation is executed in the first squeezing operation, and the binding operation is executed in the second squeezing operation. When the gripping operation and the binding operation are executed in turns, the objects to be bound can be bound. The bonding unit for bonding the both end portions of the tape loop is not limited to the staple. The both end portions of the tape loop may be bonded by adhesion or welding.

As illustrated in FIG. 1 and the like, the main handle 11 is a bar-like member which is linearly formed, and is formed such that the tape and the staple can be formed along a longitudinal direction. A staple magazine 12, a pusher unit 13, a tape guide 16, a staple driver, and a tape magazine 20 are attached to the main handle 11.

The staple magazine 12 is a long member for accommodating the staple. As illustrated in FIG. 1 and the like, the staple magazine 12 is disposed along the longitudinal direction of the main handle 11, and can accommodate the staple therein. As the staple accommodated in the staple magazine 12, a plurality of U-shaped staples bonded with an adhesive are used. The staple accommodated in the staple magazine 12 is pushed toward the front end direction by the pusher unit 13 which will be described below. At the front end portion of the staple magazine 12, a long hole is provided to introduce the staple driver which will be described below. In addition, the staple magazine 12 is attached to the main handle 11 so as to be rockable around a shaft provided at a rear end side.

Figure 6:
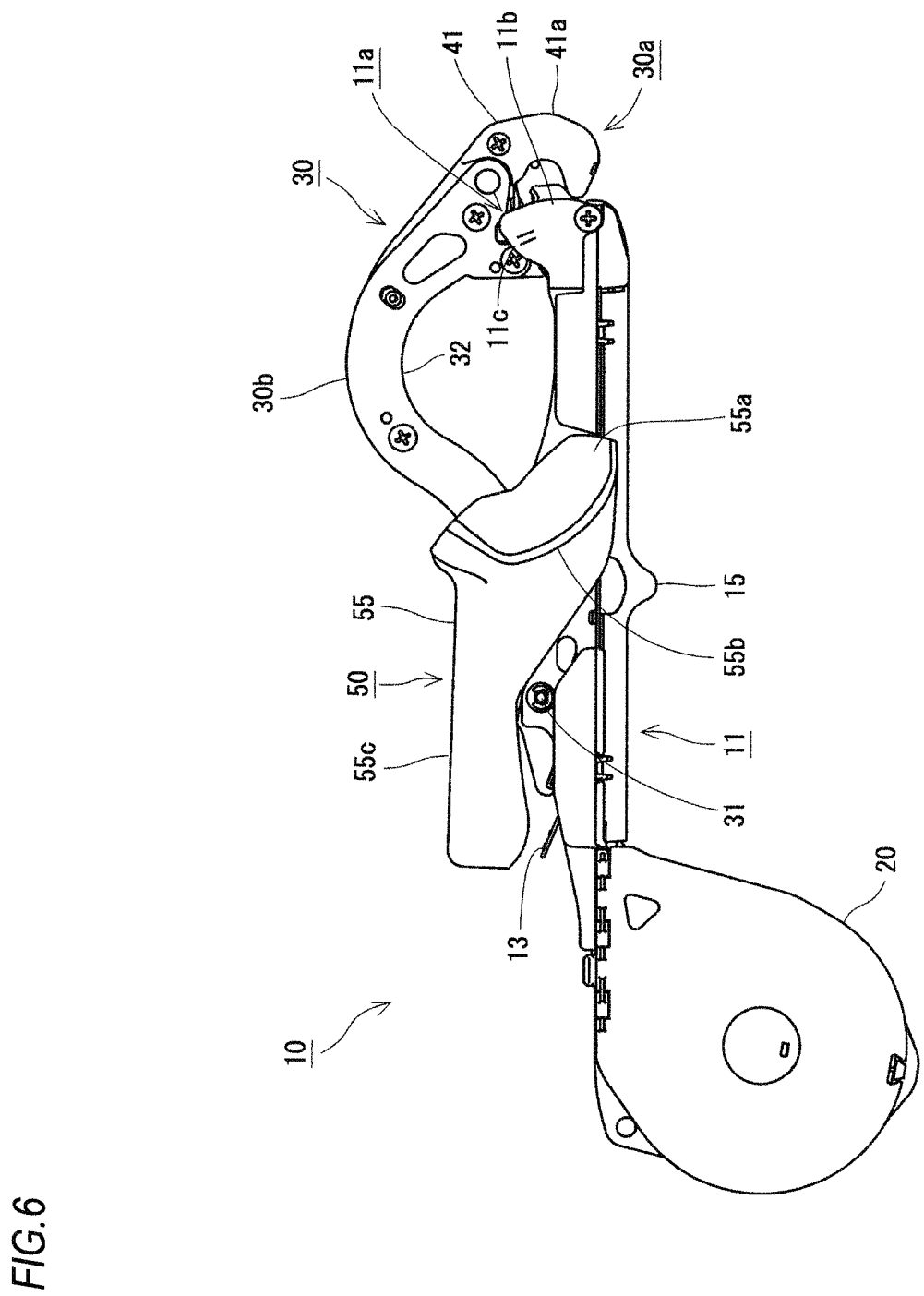
FIG. 6 is a side view of a binding machine for gardening to which another cover member is attached.

As illustrated in FIG. 1 and the like, the pusher unit 13 is a member that can be inserted and attached to the staple magazine 12. As illustrated in FIG. 6 and the like, the pusher unit 13 urges the staple accommodated in the staple magazine 12 toward the front. When the staple is set in the staple magazine 12, the pusher unit 13 is drawn down to insert the staple from the top of the staple magazine 12.

Although not specifically illustrated, the staple driver is a plate fixed to the front end portion 11a of the main handle 11 so as to face the vicinity of the front end portion of the staple magazine 12. The staple driver is formed to have substantially the same width as the staple so that only one staple can be ejected. When the clincher arm 30 rotates to the state of being completely closed with respect to the main handle 11, the staple driver enters into the staple magazine 12, thereby ejecting the leading staple accommodated in the staple magazine 12. Specifically, when the clincher arm 30 moves in the closing direction, the clincher arm 30 pushes the staple magazine 12 to rock it toward the staple driver. As the staple magazine 12 rocks, the staple driver enters into the staple magazine 12, thereby ejecting the staple. After penetrating through the tape, the ejected staple is clinched by the clincher 33 to be described below, so that two legs thereof are refracted to embrace the tape and thus bonded to an end portion of the overlapped tape.

As illustrated in FIG. 1 and the like, the tape magazine 20 is provided continuously with a rear end portion of the main handle 11 to accommodate the tape. The tape magazine 20 is capable of accommodating the tape wound in a reel shape, and has a lid which can be openable to take in and out the tape. The tape accommodated in the tape magazine 20 is drawn out to the front end portion 11a of the main handle 11 along the main handle 11. In the tape drawn out to the front end portion 11a of the main handle 11, the end portion thereof is held by the tape guide 16 which will be described below.

As illustrated in FIG. 1, the tape guide 16 is disposed at the front end portion 11a of the main handle 11. The tape guide 16 has a guide path at a center thereof, the tape being guided so as to be drawable through the guide path. The guide path of the tape guide 16 has such a shape as to cover four sides such as both sides, a front side, and a rear side of the tape 60, so that the inserted tape is not detached. The tape inserted through the guide path is drawn out from the front end and faces the clincher arm 30. The end portion of the tape is gripped by a tape gripping device 35, which will be described below, of the clincher arm 30, and is drawn out by a required amount. A cutting blade is fixed to the tape guide 16 to cut the tape after binding of the objects to be bound.

As illustrated in FIG. 1, both sides of the tape guide 16 and the cutting blade are covered with a sidewall 11b which is a part of the main handle 11, and as illustrated in FIG. 2 and the like, the tape guide 16 and the cutting blade are not exposed in a side view. Therefore, even when foreign materials are sandwiched by the front end portion 11a of the main handle 11, the cutting blade is not stuck by the foreign materials. A rear side of the sidewall 11b is an inclined portion 11c, so that even when the object to be bound is sandwiched by the front end portion 11a of the main handle 11, the object to be bound can be guided toward the rear side (inner side between the main handle 11 and the clincher arm 30).

Figure 5:
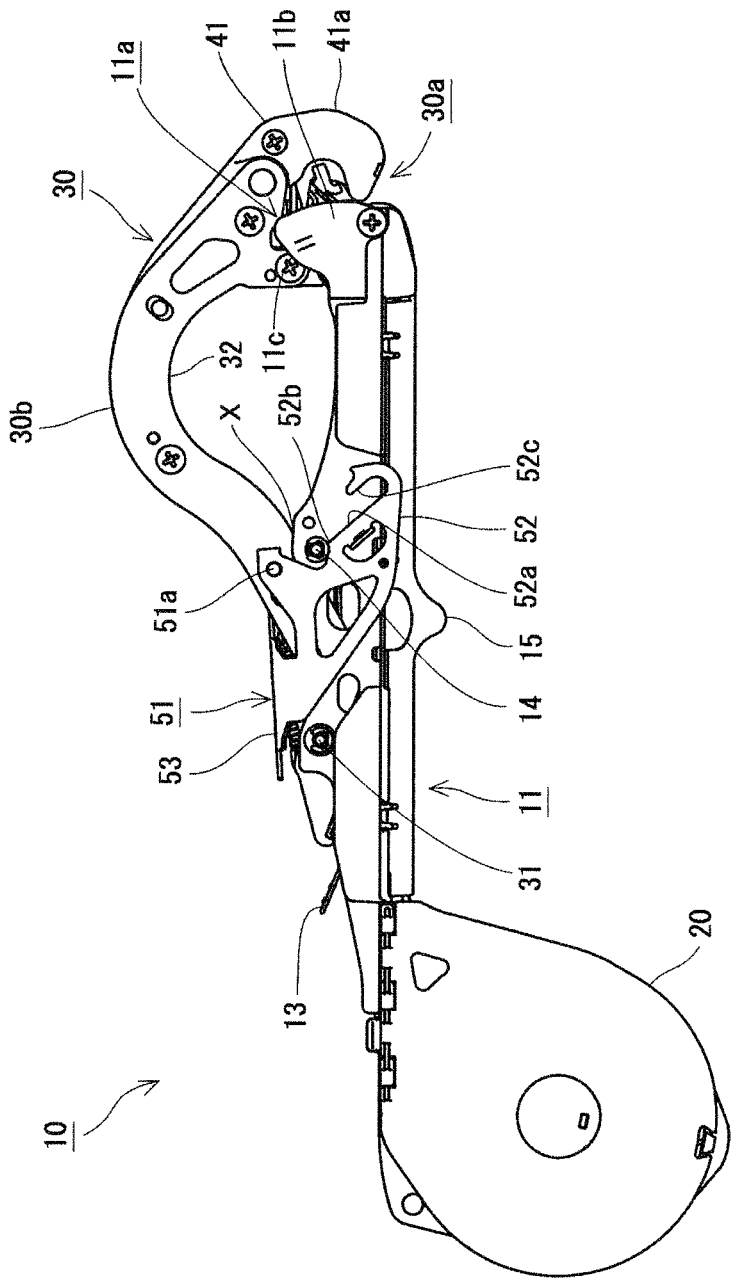
FIG. 5 is a side view of the binding machine for gardening from which the cover member of the operation handle is removed and illustrates a state in which the clincher arm is completely closed with respect to the main handle.

As illustrated in FIGS. 4 and 5, a roller-like engaging portion 14 is protrudingly formed on both sides of the main handle 11, and a finger hooking portion 15 is protrudingly formed on a lower surface of the main handle 11. The roller-like engaging portion 14 is a projection for slidably guiding a link portion 52 of the operation handle 50 which will be described below. The finger hooking portion 15 is a projection for hooking a finger squeezing the handle when the main handle 11 and the operation handle 50 are gripped.

As illustrated in FIG. 1 and the like, the clincher arm 30 is constituted by a pair of sheet metal members 30b connected to each other in parallel. The clincher arm 30 includes an arm portion 32 that extends curvedly toward the front end portion 30a so that a C-shaped opening can be formed between the clincher arm 30 and the main handle 11. The clincher arm 30 is rotatably attached to the main handle 11 by a rotating shaft 31 provided in the vicinity of the rear end portion.

The clincher 33, the tape gripping device 35, and a gripping device cover 41 are attached to the clincher arm 30.

The clincher 33 is fixed to the front end portion 30a of the clincher arm 30 so as to face the front end portion of the staple driver described above. Thus, when the staple is ejected by the staple driver, the two legs of the ejected staple are clinched by the clincher 33 and bent inward. When the clincher 33 bends the two legs of the staple inward, so that the two legs bind the tape and are thus bonded thereto.

The tape gripping device 35 is attached to the front end portion 30a of the clincher arm 30 and is capable of gripping the end portion of the tape drawn out from the front end portion 11a of the main handle 11. The tape gripping device 35 is configured to execute a gripping operation of gripping the tape when the clincher arm 30 is closed in a standby state where the tape is not gripped, and return to the standby state when the clincher arm 30 is closed in a gripping state where the tape is gripped.

The gripping device cover 41 is a cover that covers the tape gripping device 35 described above, and is fixed between two sheet metal members 30b of the clincher arm 30. The gripping device cover 41 according to the embodiment is constituted by split pieces that can be split in left and right directions, and accommodates the tape gripping device 35 therein. The gripping device cover 41 has an opening at a lower side, and the tape gripping device 35 are disposed at the back of the opening. The gripping device cover 41 includes a forward protruding portion 41a that covers the front side of the tape gripping device 35. Since the forward protruding portion 41a protrudes forward from the front end portion of the sheet metal member 30b, when the clincher aim 30 is inserted between crops, only the forward protruding portion 41a formed in a curved shape comes in contact with the crops, but the tape gripping device 35 does not come in contact with the crops.

As illustrated in FIGS. 2 to 5, the operation handle 50 includes a base member 51 fixed to the main body of the binding machine for gardening 10 and a cover member 55 detachable from the base member 51.

The base member 51 is a metal component acting directly on the main handle 11 and the clincher arm 30. The base member 51 is attached to the clincher arm 30 so as to be rotatable about a rotation fulcrum 51a as illustrated in FIGS. 4 and 5. Then, the base member 51 includes the link portion 52 engaged with the main handle 11 at one side thereof as viewed from the rotation fulcrum 51a and a handle support portion 53 at the other side thereof as viewed from the rotation fulcrum 51a. The handle support portion 53 is attached with the cover member 55, thereby functioning as a lever operation portion 55c.

The link portion 52 is engaged with the main handle 11 and serves as a point of application of a lever. A hook 52c is formed at the front end portion of the link portion 52, and the hook 52c is engaged with the roller-like engaging portion 14 of the main handle 11, whereby the clincher arm 30 maintains a state of being opened at a predetermined angle with respect to the main handle 11 as illustrated in FIG. 4.

From this state, when the operation handle 50 and the main handle 11 are gripped, as illustrated in FIG. 5, the hook 52c is disengaged from the roller-like engaging portion 14, and the roller-like engaging portion 14 slides on a sliding surface 52a formed on a front surface of the link portion 52. In this way, as the sliding surface 52a slides along the roller-like engaging portion 14, the clincher arm 30 rotates in the closing direction with respect to the main handle 11. An inclination of the sliding surface 52a used for the engagement of the roller-like engaging portion 14 changes stepwise in order to reduce an operation load when the staple is ejected. That is, the inclination of the sliding surface 52a becomes larger at the time of the binding operation rather than at the time of the gripping operation, so that a larger force can be obtained at the time of the binding operation even with the same operation load. Thus, the binding operation requiring a large force can be also performed with a light operation load. In this way, since the inclination of the sliding surface 52a changes, a projection 52b is formed in a place where the inclination of the sliding surface 52a changes.

As illustrated in FIG. 2 and the like, the cover member 55 is a resin member that covers the base member 51 so as to prevent it from being exposed. All the portions, to be contacted to the outside or to be operated, of the operation handle 50 are covered with the cover member 55. The cover member 55 includes a hook cover 55a and a lever operation portion 55c.

The hook cover 55a covers the link portion 52 and a crossing portion X (see FIGS. 4 and 5) between the main handle 11 and the clincher arm 30. On the side surface of the hook cover 55a, a semicircular curved projection 55b is provided along the finger squeezing the lever operation portion 55c and the main handle 11 as illustrated in FIG. 1 and the like. Since the curved projection 55b is provided, the operation handle 50 is easily gripped and can be held with a light grip even when the machine is held upward.

The lever operation portion 55c covers the handle support portion 53, and is gripped by an operator when the operation handle 50 is operated. When the lever operation portion 55c is gripped in a direction approaching the main handle 11, the base member 51 rotates about the rotation fulcrum 51a, and the link portion 52 acts on the main handle 11, whereby the main handle 11 and the clincher arm 30 rotate in the closing direction with respect to each other.

In the embodiment, since the cover member 55 is detachable from the base member 51, it can be also replaced with a cover member 55 having a different shape as illustrated in FIG. 6. By replacement with the cover member 55 having the different shape, it is possible to change the size of the lever operation portion 55c depending on the size of the hand, or to provide the curved projection 55b on a specific side surface according to the difference in a dominant arm.

Figure 7:
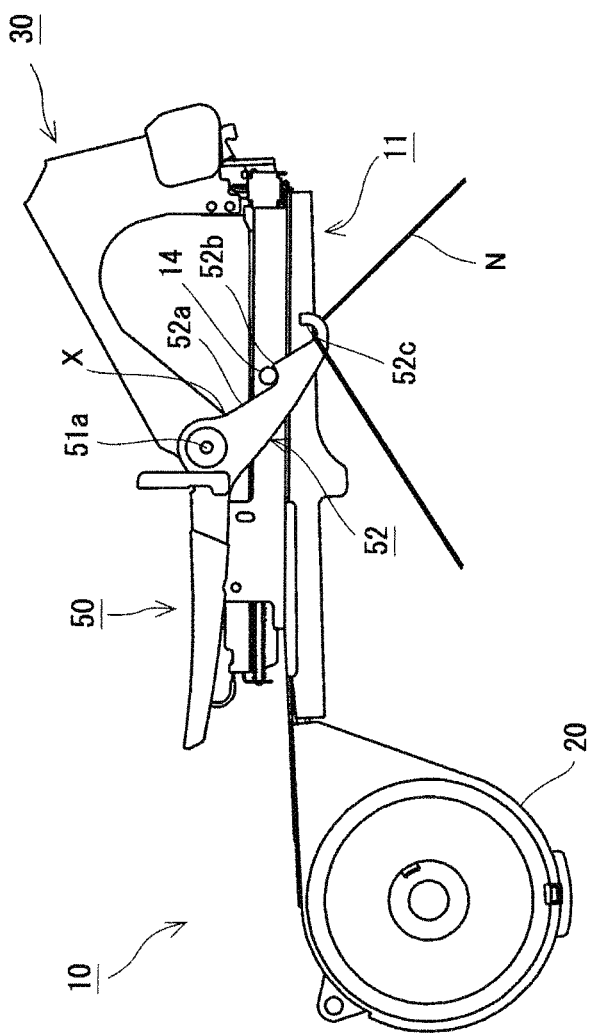
FIG. 7 is a side view of a binding machine for gardening according to the related art.

Further, the cover member 55 described above covers the hook 52c so as not to be exposed in a side view as illustrated in FIGS. 1 to 3. In a binding machine for gardening 10 according to the related art, as illustrated in FIG. 7, there are problems that the hook 52c jumps out from the machine when the handle is gripped, the hook 52c is caught on a net string N or the like for supporting crops to pull the net string N, and the net string N is sandwiched into the machine, resulting in locking the machine. However, according to the embodiment, since the hook 52c is covered with the cover member 55, such problems do not occur. Moreover, in the embodiment, even when the clincher arm 30 rotates to the completely closed state as illustrated in FIG. 5, the hook 52c does not protrude from the main handle 11 in a side view. As described above, since the hook 52c is always located inside the main handle 11 and does not protrude outward, the problem that the hook 52c is caught on the net string N or the like is further less likely to occur.

In the binding machine for gardening 10 according to the related art, as illustrated in FIG. 7, since the projection 52b and the crossing portion X are not exposed, there is a concern that the crop may be damaged by the projection 52b and the crossing portion X. In this regard, the cover member 55 according to the embodiment covers the projection 52b and the crossing portion X as illustrated in FIGS. 1 to 3. Accordingly, even when the crop is inserted to the depth side of the machine, the crop does not come in contact with the projection 52b and the crossing portion X, and thus the crop is hardly damaged.

The binding machine for gardening 10 according to the embodiment includes not only the curved projection 55b described above but also a finger hooking portion 15 that is protrudingly formed on a lower part of the main handle 11, and thus the machine can be supported by at least two points using the finger hooking portion 15 and the curved projection 55b when the main handle 11 and the lever operation portion 55c are gripped. Since the machine can be supported by the two points in this way, it is possible to stably hold the machine with a good balance.

Particularly, during guiding work of fruit trees and vegetables, since the operation of grasping the binding machine for gardening 10 is repeated, hands and arms tend to be tired. In particular, since the guiding work of crops such as grapes is performed upward, grip strength is weakened due to fatigue, and thus there is a possibility that the machine body drops down. Then, since a working place is mainly a field, dust adheres to the machine which has dropped down, resulting in causing an operational failure. There is the machine according to the related art including the finger hooking portion 15. However, in the case of the machine including only the finger hooking portion 15, the effect can be exhibited as long as a holding method is proper, but since the work is also actually performed while changing the direction of the machine in the hand in some cases, the machine may drop down in the case of being supported at only one point.

In this regard, according to the binding machine for gardening 10 of the embodiment, since the hook is formed in a lateral direction by the curved projection 55b of the cover member 55, the hook is in a state of being formed around the entire circumference at the middle part of the binding machine for gardening 10. Thus, even when the work is performed while changing the direction of the machine in the hand, at least one of the curved projection 55b or the finger hooking portion 15 is hooked by the finger, whereby it is possible to prevent the machine from dropping down.

Moreover, even if the machine drops down, since the sliding portion (the roller-like engaging portion 14 or the rotation fulcrum 51a), which causes the operational failure, is covered with the cover member 55, soil hardly adheres to the sliding portion. Accordingly, as the cover member 55 is provided, it is possible to prevent the machine from dropping down and to remove the cause of the operational failure even when the machine drops down.

As described above, according to the embodiment, the operation handle 50 includes the link portion 52 engaged with the main handle 11 on one side as viewed from the rotation fulcrum 51a and the lever operation portion 55c on the other side as viewed from the rotation fulcrum 51a, and the operation handle 50 further includes the cover member 55 that covers the link portion 52. With such a configuration, when the machine drops down or the machine is placed on the ground, foreign materials do not adhere to the periphery of the link portion 52, and thus the sliding failure of the link portion 52 can be prevented. Further, the problem also does not occur that the hook 52c formed at the front end portion of the link portion 52 is entangled in the net string N.

In addition, the curved projection 55b is provided along the finger squeezing the lever operation portion 55c and the main handle 11, on the side portion of the cover member 55. With such a configuration, it is possible to easily hold the machine by hooking the finger in the curved projection 55b, and to prevent the machine from dropping accidentally down.

Further, the cover member 55 covers the crossing portion X of the main handle 11 and the clincher arm 30. With such a configuration, when the machine drops down or the machine is placed on the ground, foreign materials do not adhere to the periphery of the crossing portion X, and thus the sliding failure of the crossing portion X can be prevented.

The lever operation portion 55c is formed by the cover member 55. With such a configuration, only by the replacement with the cover member 55 having a different shape, the lever operation portion 55c having a shape matching the worker's hand can be provided. Accordingly, it is possible to provide the binding machine for gardening 10, which is easy to grip and to work, at a low cost.

Although not specifically described above, the roller member of the roller-like engaging portion 14 may be replaceable. When the roller member of the roller-like engaging portion 14 is replaceable, since the cover member 55 according to the embodiment covers the roller-like engaging portion 14, it is possible to prevent dust from adhering to the portions such as screws, pins, or retaining rings constituting the attachment/detachment structure of the roller-like engaging portion 14. Accordingly, it is also effective in the problem that the replacement of the roller-like engaging portion 14 becomes difficult due to the adhering of dust.

In the embodiment described above, the cover member 55 covers the entire operation handle 50, but may cover only a part of the operation handle 50 without being limited thereto. For example, the cover member 55 may cover only the hook 52c, only the crossing portion X of the operation handle 50 and the clincher arm 30, only the projection 52b, only the roller-like engaging portion 14, or only the rotation fulcrum 51a.

Further, the cover member 55 may not be an independent member. For example, the cover member 55 may be formed integrally with the main handle 11, the operation handle 50, and the like.

(1) A binding machine for gardening comprising:
a main handle that is configured to draw out a tape from a front end portion thereof;
a clincher arm that is rotatably attached to the main handle;
a tape gripping device that is attached to a front end portion of the clincher aim and that is configured to grip an end portion of the tape drawn out from the front end portion of the main handle; and
an operation handle that is attached to the clincher arm so as to be rotatable about a rotation fulcrum, wherein
the operation handle includes a link portion engaged with the main handle on one side as viewed from the rotation fulcrum and a lever operation portion on the other side as viewed from the rotation fulcrum,
the clincher aim is configured to rotate in a closing direction with respect to the main handle when the lever operation portion and the main handle are gripped, and
the binding machine for gardening further comprises a cover member configured to cover the link portion.
(2) The binding machine for gardening according to (1), wherein
a hook is formed at a front end portion of the link portion, and
the cover member is configured to cover the hook.
(3) The binding machine for gardening according to (1) or (2), wherein
the cover member is provided with a curved projection, which is formed along a finger squeezing the lever operation portion and the main handle, on a side portion thereof.
(4) The binding machine for gardening according to any one of (1) to (3), wherein
the curved projection is formed on a side portion of the link portion.
(5) The binding machine for gardening according to any one of (1) to (4), wherein
the cover member covers a crossing portion of the main handle and the clincher arm.
(6) The binding machine for gardening according to any one of (1) to (5), wherein
the lever operation portion is formed by the cover member.

The invention claimed is:
1. A binding machine for gardening or agriculture comprising:
a main handle which includes a guide for guiding a tape and from which the tape is drawn out from a front end portion thereof;
an engaging portion which includes a projection that protrudes from at least one side of the main handle;
a clincher arm that is rotatably attached to the main handle, and wherein the main handle and the clincher arm cross each other at a crossing portion;
a tape gripping device that is attached to a front end portion of the clincher arm and that grips an end portion of the tape drawn out from the front end portion of the main handle; and
an operation handle that is attached to the clincher arm so as to be rotatable about a rotation fulcrum, wherein
the operation handle includes a link portion engaged with the main handle and a lever operation portion;
wherein the link portion includes a hook at a front end portion of the link portion, a sliding surface, and a sliding surface projection at a location along the sliding surface at which an inclination angle of the sliding surface changes;
wherein the clincher arm rotates in a closing direction with respect to the main handle when the lever operation portion and the main handle are gripped and the lever operation portion is moved toward the main handle from an open position to a closed position,
wherein the engaging portion engages with the hook of the link portion in the open position, and the sliding surface of the link portion slides along the engaging portion as the lever operation portion is moved toward the main handle during movement from the open position to the closed position,
a cover which covers the hook, the sliding surface and the sliding surface projection of the link portion, wherein the cover also covers the engaging portion and the crossing portion between the clincher arm and the main handle,
wherein the lever operation portion is formed as part of the cover, and
wherein the cover includes a curved projection formed along a side of the cover,
the binding machine further including a handle support portion which is connected to said link portion, and wherein the lever operation portion of the cover extends over a top of the handle support portion at a top of the cover, wherein the side of the cover extends downwardly from the top of the cover and the curved projection projects from the side in a sideways direction, and wherein at least in the open position, where the main handle is horizontal and the lever operation portion is above the main handle, the main handle is exposed outside of the cover at locations vertically below the lever operation portion.

2. The binding machine for gardening or agriculture according to claim 1, wherein the engaging portion contacts and moves over the sliding surface projection of the link portion as the lever operation portion is moved close to the closed position, and the engaging portion is past the sliding surface projection in the closed position.

3. The binding machine for gardening or agriculture according to claim 2, wherein the inclination angle of the sliding surface of the link portion provides a larger output force close to the closed position for a given input force compared to when the lever operation portion begins movement from the open position to the closed position.

4. The binding machine for gardening or agriculture according to claim 2, wherein the engaging portion includes a roller which engages and rolls along the sliding surface of the link portion.

5. The binding machine for gardening or agriculture according to claim 1, wherein the engaging portion includes a roller which engages and rolls along the sliding surface of the link portion.

6. The binding machine for gardening or agriculture according to claim 1, wherein the main handle includes two sides and the projection of the engaging portion protrudes from both sides of the main handle.

7. The binding machine for gardening or agriculture according to claim 1, wherein the cover entirely covers the crossing portion and extends to a location in front of the crossing portion, and the cover prevents material being bound between the clincher arm and the main handle from entering the crossing portion.

8. The binding machine for gardening or agriculture according to claim 1, wherein the projection projects from a region of the cover which covers the hook.

9. The binding machine for gardening or agriculture according to claim 8, wherein the cover entirely covers the crossing portion and extends to a location in front of the crossing portion, and the cover prevents material being bound between the clincher arm and the main handle from entering the crossing portion.

10. The binding machine according to claim 1, wherein the cover is formed of a resin;

wherein the cover includes a hook cover portion which covers the hook of the link portion, and the curved projection extends along a side of the hook cover portion; and the lever operation portion, the curved projection, and the hook cover portion all rotate together as the lever operation portion is pressed to move the lever operation portion from the open position to the closed position.

11. A binding machine for gardening or agriculture comprising:

a main handle which includes a guide for guiding a tape and from which the tape is drawn out from a front end portion thereof;

an engaging portion which includes a projection that protrudes from at least one side of the main handle;

a clincher arm that is rotatably attached to the main handle, and wherein the main handle and the clincher arm cross each other at a crossing portion;

a tape gripping device that is attached to a front end portion of the clincher arm and that grips an end portion of the tape drawn out from the front end portion of the main handle; and an operation handle that is attached to the clincher arm so as to be rotatable about a rotation fulcrum, wherein the operation handle includes a link portion engaged with the main handle and a lever operation portion;

wherein the link portion includes a hook at a front end portion of the link portion, a sliding surface, and a sliding surface projection at a location along the sliding surface at which an inclination angle of the sliding surface changes;

wherein the clincher arm rotates in a closing direction with respect to the main handle when the lever operation portion and the main handle are gripped and the lever operation portion is moved toward the main handle from an open position to a closed position, wherein the engaging portion engages with the hook of the link portion in the open position, and the sliding surface of the link portion slides along the engaging portion as the lever operation portion is moved toward the main handle during movement from the open position to the closed position, a cover which covers the hook, the sliding surface and the sliding surface projection of the link portion, wherein the cover also covers the engaging portion and the crossing portion between the clincher arm and the main handle, wherein the lever operation portion is formed as part of the cover, wherein the cover includes a curved projection formed along a side of the cover, the binding machine further including a handle support portion which is connected to said link portion, and wherein the lever operation portion of the cover extends over a top of the handle support portion at a top of the cover, wherein the side of the cover extends downwardly from the top of the cover and the curved projection projects from the side in a sideways direction; and the binding machine further comprising:

a finger hooking portion, and wherein with the binding machine oriented such that the main handle is in a horizontal position and the handle support portion is above the main handle, the finger hooking portion extends downwardly from the main handle; and wherein the finger hooking portion is exposed outside of the cover.

12. A binding machine for gardening or agriculture comprising:

a main handle which includes a guide for guiding a tape and from which the tape is drawn out from a front end portion thereof;

an engaging portion which includes a projection that protrudes from at least one side of the main handle;

a clincher arm that is rotatably attached to the main handle, and wherein the main handle and the clincher arm cross each other at a crossing portion;

a tape gripping device that is attached to a front end portion of the clincher arm and that grips an end portion of the tape drawn out from the front end portion of the main handle; and an operation handle that is attached to the clincher arm so as to be rotatable about a rotation fulcrum, wherein the operation handle includes a link portion engaged with the main handle and a lever operation portion;

wherein the link portion includes a hook at a front end portion of the link portion, a sliding surface, and a sliding surface projection at a location along the sliding surface at which an inclination angle of the sliding surface changes;

wherein the clincher arm rotates in a closing direction with respect to the main handle when the lever operation portion and the main handle are gripped and the lever operation portion is moved toward the main handle from an open position to a closed position, wherein the engaging portion engages with the hook of the link portion in the open position, and the sliding surface of the link portion slides along the engaging portion as the lever operation portion is moved toward the main handle during movement from the open position to the closed position, a cover which covers the hook, the sliding surface and the sliding surface projection of the link portion, wherein the cover also covers the engaging portion and the crossing portion between the clincher arm and the main handle, wherein the lever operation portion is formed as part of the cover, wherein the cover includes a curved projection formed along a side of the cover, the binding machine further including a handle support portion which is connected to said link portion, and wherein the lever operation portion of the cover extends over a top of the handle support portion at a top of the cover, wherein the side of the cover extends downwardly from the top of the cover and the curved projection projects from the side in a sideways direction:

wherein the cover is formed of a resin;

wherein the cover includes a hook cover portion which covers the hook of the link portion, and the curved projection extends along a side of the hook cover portion; and the lever operation portion, the curved projection, and the hook cover portion all rotate together as the lever operation portion is pressed to move the lever operation portion from the open position to the closed position.

* * * * *